United States Patent
Caliano et al.

(10) Patent No.: US 10,214,629 B2
(45) Date of Patent: Feb. 26, 2019

(54) CLASS OF ANTIOXIDANT AGENTS FOR POLYMER PRODUCTS

(71) Applicant: BRIDGESTONE CORPORATION, Tokyo (JP)

(72) Inventors: Ludovica Caliano, Rome (IT); John House, Rome (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 139 days.

(21) Appl. No.: 15/520,651

(22) PCT Filed: Oct. 21, 2015

(86) PCT No.: PCT/IB2015/058123
§ 371 (c)(1),
(2) Date: Apr. 20, 2017

(87) PCT Pub. No.: WO2016/063232
PCT Pub. Date: Apr. 28, 2016

(65) Prior Publication Data
US 2017/0306128 A1 Oct. 26, 2017

(30) Foreign Application Priority Data

Oct. 21, 2014 (IT) .............................. RM2014A0597

(51) Int. Cl.
| | |
|---|---|
| *C08K 5/13* | (2006.01) |
| *C08L 7/00* | (2006.01) |
| *C08L 9/00* | (2006.01) |
| *B60C 1/00* | (2006.01) |
| *C08K 3/04* | (2006.01) |
| *C08K 3/06* | (2006.01) |
| *C08K 3/22* | (2006.01) |
| *C08K 5/09* | (2006.01) |
| *C08K 5/47* | (2006.01) |

(52) U.S. Cl.
CPC .................. *C08K 5/13* (2013.01); *B60C 1/00* (2013.01); *C08K 3/04* (2013.01); *C08K 3/06* (2013.01); *C08K 3/22* (2013.01); *C08K 5/09* (2013.01); *C08K 5/47* (2013.01); *C08L 7/00* (2013.01); *C08L 9/00* (2013.01)

(58) Field of Classification Search
CPC ........................................................ C08K 5/13
See application file for complete search history.

(56) References Cited

U.S. PATENT DOCUMENTS

| | | |
|---|---|---|
| 1,947,458 A | 2/1934 | Calcott et al. |
| 2,801,980 A | 8/1957 | Spacht |
| 5,334,695 A * | 8/1994 | Roggero ................ C08G 63/60 528/176 |

* cited by examiner

*Primary Examiner* — Wenwen Cai
(74) *Attorney, Agent, or Firm* — Sughrue Mion, PLLC

(57) ABSTRACT

A rubber mixture comprising at least one polymer base with a cross-linkable unsaturated chain, a vulcanization system, and antioxidant agents comprising in monomer form one or more compounds covered by the general formula (I)

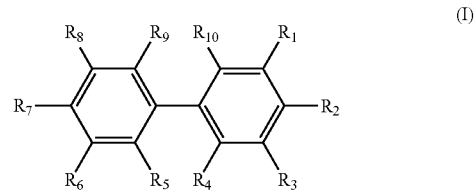

(I)

wherein,
the substituents $R_1$, $R_2$, $R_3$, $R_4$ and $R_{10}$, which are equal to or different from one another, are chosen among H, OH, and $(CH_2)nCHCH_2$ with n as an integer number ranging from 1 to 10;
provided that, among the substituents $R_1$, $R_2$, $R_3$, $R_4$ and $R_{10}$, at least one is OH and at least one is $(CH_2)nCHCH_2$; and
the substituents $R_5$, $R_6$, $R_7$, $R_8$ and $R_9$, which are equal to or different from one another, are chosen among H, OH, and $(CH_2)nCHCH_2$ with n as an integer number ranging from 1 to 10;
provided that, among the substituents $R_5$, $R_6$, $R_7$, $R_8$ and $R_9$, at least one is OH and at least one is $(CH_2)nCHCH_2$.

8 Claims, No Drawings

CLASS OF ANTIOXIDANT AGENTS FOR POLYMER PRODUCTS

TECHNICAL FIELD

The present invention relates to a new class of anti-ageing agents for polymer products.

In particular, the invention is advantageously applied in the tyre sector to which the description will explicitly refer without loss of generality.

BACKGROUND ART

As is known, the rubber mixtures employed in production of the various tyre parts entail the use of anti-ageing agents to prevent deterioration of the rubber due to the reaction of the polymer base with oxygen and/or ozone.

The anti-ageing agents are materials added to the compounds subject to oxidation, such as the polymers, in order to inhibit or slow down the oxidative processes (since they themselves are oxidised). In other words, the anti-ageing agents are materials able to react with the atmospheric agents, preventing the latter reacting with the polymer base.

The concentration in the mixture of the anti-ageing agents depends on the level of exposure to the atmosphere and on the temperature and mechanical stress to which the specific tyre portion to which the mixture refers is subject.

The anti-ageing agents most commonly used belong to the family of the paraphenylenediamines (PPD), for example N-1,3-dimethylbutyl-N'-phenyl-paraphenylenediamine (6PPD), N,N'-diphenyl-p-phenylenediamine (DPPD), or they can be phenol derivatives such as 2,6-Di-tert-butyl-4-methylphenol (BHT), or to the family of the quinolines, for example poly(1,2-dihydro-2,2,4-trimethylquinoline) (TMQ).

During its research, the Applicant found a new class of anti-ageing agents which are able to constitute a valid alternative to the known anti-ageing agents.

DISCLOSURE OF INVENTION

The subject of the present invention is a rubber mixture comprising at least a polymer base with a cross-linkable unsaturated chain, a vulcanization system and one or more antioxidant agents; said mixture being characterised in that said antioxidant agents are compounds having general formula (I) and are used in monomer form;

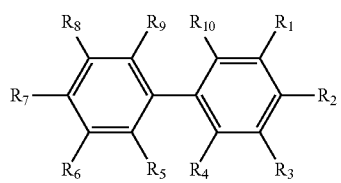

(I)

wherein,
the substituents $R_1$, $R_2$, $R_3$, $R_4$ and $R_{10}$, which are equal to or different from one another, are chosen from H, OH and $(CH_2)nCHCH_2$ with n as an integer number ranging from 1 to 10;
provided that, among the substituents $R_1$, $R_2$, $R_3$, $R_4$ and $R_{10}$, at least one is OH and at least one is $(CH_2)nCHCH_2$; and
the substituents $R_5$, $R_6$, $R_7$, $R_8$ and $R_9$, which are equal to or different from one another, are chosen from H, OH and $(CH_2)nCHCH_2$ with n as an integer number ranging from 1 to 10;
provided that, among the substituents $R_5$, $R_6$, $R_7$, $R_8$ and $R_9$, at least one is OH and at least one is $(CH_2)nCHCH_2$.

The antioxidant agents having general formula (I) must be present in monomer form since the double bond of the group $(CH_2)nCHCH_2$ must be available to react with the polymer base and, therefore, cannot be engaged in polymerization reactions. Binding the compounds with antioxidant activity to the polymer base (by means of the double bond of the $(CH_2)nCHCH_2$ group) offers the advantages (a) of preventing their surface migration in the mixture and the consequent phenomenon of blooming, (b) of promoting dispersion of the oxidant agent in the polymer base and (c) of reducing the potentially oxidisable groups (double bonds) present in the polymer base.

Preferably, among the substituents $R_1$, $R_2$, $R_3$, $R_4$ and $R_{10}$ only one is OH and only one is $(CH_2)nCHCH_2$; and among the substituents $R_5$, $R_6$, $R_7$, $R_8$ and $R_9$ only one is OH and only one is $(CH_2)nCHCH_2$.

Preferably, the antioxidant agent is chosen from the compounds having structural formula II or III

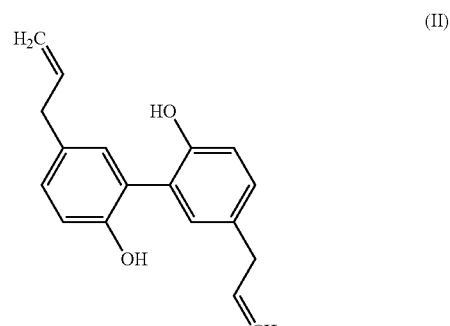

(II)

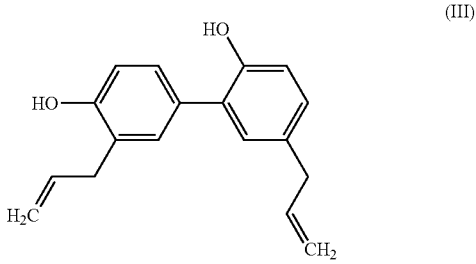

(III)

Here and below, by vulcanization system we mean a complex of ingredients comprising at least sulphur and accelerating compounds, which in the preparation of the mixture are added in a final mixing step, and have the purpose of promoting vulcanization of the polymer base once the mixture is subject to a vulcanization temperature.

Here and below, by the term "polymer base with cross-linkable unsaturated chain" we mean any natural or synthetic non-cross-linked polymer able to take on all the chemical-physical and mechanical characteristics typically taken on by elastomers following cross-linking (vulcanization) with sulphur-based systems.

Preferably, the antioxidant agent of the present invention is present in the mixture in a quantity of between 1 and 5 phr.

A further subject of the present invention is a tyre portion produced with a rubber mixture comprising an antioxidant agent subject of the present invention.

A further subject of the present invention is a tyre in which at least one of its portions is made with the mixture comprising an anti-ageing agent subject of the present invention.

A further subject of the present invention is a method for the preparation of rubber mixtures characterised in that it comprises a non-productive mixing step, during which a polymer base with a cross-linkable unsaturated chain and an antioxidant agent having general formula (I) subject of the present invention are mixed together; a subsequent non-productive mixing step during which other ingredients of the mixture, except for the vulcanization system, are added to and mixed with the mixture coming from the preceding non-productive mixing step; and a productive mixing step during which a vulcanization system is added to and mixed with the mixture coming from the non-productive mixing steps.

Here and below by "non-productive mixing step" we mean a mixing step during which the ingredients of the mixture, excluding the vulcanization system, are added to and mixed with the polymer base with cross-linkable unsaturated chain; whereas by "productive mixing step" we mean a mixing step during which the vulcanization system is added to and mixed with the mixture being prepared.

BEST MODE FOR CARRYING OUT THE INVENTION

For a better understanding of the invention, embodiments are described below purely by way of non-limiting example.

Examples 7 mixtures were prepared, the first of which (Mixture A) constitutes a comparison example representing a commonly used mixture. The Mixture A comprises BHT as anti-ageing agent, whereas the other mixtures (Mixtures B-G) are produced according to the teachings of the present invention and use anti-ageing agents consisting of compounds included in the general formula (I).

The examples of the invention are distinguished from one another according to the antioxidant agent used and according to the preparation method. In particular, the Mixtures E-G have the same composition as the Mixtures B-D respectively from which they are distinguished only by the preparation procedure used. While the mixtures B-D were prepared by mixing in one single mixing step all the ingredients of the mixture with the exception of the vulcanization system, the Mixtures E-G were prepared by mixing the polymer base and the antioxidant agent in a preceding mixing step.

In fact, the inventors found that better results are obtained when the polymer base and the antioxidant agent are mixed separately from the other ingredients.

The mixtures of the examples were prepared according to the procedure described below.
—Preparation of the Mixtures—
(1st Mixing Step)

The polymer base, the antioxidant agent, the carbon black and the stearic acid were loaded, before commencing mixing, into a mixer with tangential rotors and internal volume ranging from 230 to 270 liters, reaching a filling factor ranging from 66-72%. For the Mixtures E-G in this first mixing step only the polymer base and the antioxidant agent were loaded in the mixer.

The mixer was operated at a speed of 40-60 r.p.m. and the resulting mixture was discharged once a temperature ranging from 145-165° C. had been reached.
(2nd Mixing Step)

The mixture obtained from the preceding step was mixed again in the mixer operated at a speed ranging from 40-60 r.p.m. and, subsequently, discharged once a temperature ranging from 130-150° C. had been reached. For the Mixtures E-G, in this second mixing step the carbon black and the stearic acid were added to the mixture coming from the preceding mixing step.
(3rd Mixing Step)

Stearic acid and the vulcanization system consisting of sulphur, accelerants and zinc oxide were added to the mixture obtained from the preceding step, reaching a filling factor ranging from 63-67%.

The mixer was operated at a speed ranging from 20-40 r.p.m. and the resulting mixture was discharged once a temperature ranging from 80-110° C. had been reached.

Table I shows the compositions in phr of the Mixtures A-G.

TABLE I

|  | A | B (E) | C (F) | D (G) |
|---|---|---|---|---|
| NR |  |  | 50.0 |  |
| BR |  |  | 50.0 |  |
| Carbon black |  |  | 50.0 |  |
| Zn oxide |  |  | 3.0 |  |
| Stearic acid |  |  | 2.0 |  |
| Antioxidant* | 4.0 | — | — | — |
| Antioxidant** | — | 4.0 | — | 2.0 |
| Antioxidant*** | — | — | 4.0 | 2.0 |
| Sulphur |  |  | 1.0 |  |
| Accelerant |  |  | 1.0 |  |

NR is a 1,4-cis polyisoprene rubber of natural origin.
BR is a butadiene rubber with a content of at least 40% of 1,4 cis.
The carbon black is classified by the abbreviation N550.
Antioxidant* is 2,6-Di-tert-butyl-4-methylphenol (BHT).
Antioxidant** is Magnolol, the structural formula of which is indicated above by (II).
Antioxidant*** is è Honokiol, the structural formula of which is indicated above by (III).

CBS is the vulcanization accelerant benzothiazyl-cyclo-hexyl-sulfenamide.

The mixtures reported in Table I underwent tests to evaluate their mechanical properties.

The mechanical properties were measured in compliance with the ASTM D412C standard.

In particular the properties relative to the modulus M300 and to the elongation at break (EB) were measured.

The mechanical properties were measured on samples both before and after an ageing process which entailed keeping the samples in a stove at 100° C. in compliance with the ISO 188 standard.

Table II shows the results relative to the mechanical properties for the above examples.

To more immediately highlight the advantages of the mixture of the present invention, the values obtained from the tests were reported in Table II in a form indexed to the results obtained from the comparison Mixture A before it underwent the ageing process.

TABLE II

|  | A | B | C | D | E | F | G |
|---|---|---|---|---|---|---|---|
| Before the ageing process |  |  |  |  |  |  |  |
| M300 | 100 | 100 | 100 | 100 | 100 | 100 | 100 |
| EB | 100 | 100 | 100 | 100 | 100 | 100 | 100 |
| After the ageing process |  |  |  |  |  |  |  |
| M300 | 150 | 135 | 135 | 135 | 130 | 130 | 130 |
| EB | 70 | 80 | 80 | 80 | 80 | 80 | 80 |

As can be seen from the values reported in Table II, use of the antioxidant agents of the present invention in the mixture guarantees in the long term better maintenance of the mechanical properties of the mixture with respect to the antioxidant agents of the known art. In fact, the mixtures of the invention, once aged, although they present elongation at break values lower than those of the non-aged mixture, nevertheless show a reduction percentage below what was observed in the case of the control mixture A. In the same way, the mixtures of the invention, once aged, although they present M300 values higher than those of the non-aged mixture, nevertheless show an increment percentage below what was observed in the case of the control mixture A.

In particular, the M300 values of Table II also show that premixing of the oxidising agent with the polymer base only is able to provide even better results.

The invention claimed is:

1. A rubber mixture comprising:
   at least one polymer base having a cross-linkable unsaturated chain,
   a vulcanization system, and
   one or more antioxidant agents;
   wherein said one or more antioxidant agents are compounds according to formula (I):

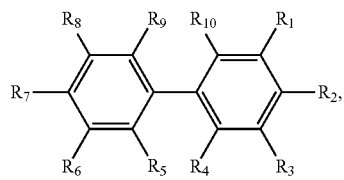

(I)

wherein, in formula (I), the substituents R1, R2, R3, R4 and R10, which are equal to or different from one another, are selected from the group consisting of —H, —OH, and —(CH2)nCHCH2 with n as an integer number ranging from 1 to 10; provided that, among the substituents R1, R2, R3, R4 and R10, at least one is —OH and at least one is —(CH2)nCHCH2; and
   the substituents R5, R6, R7, R8 and R9, which are equal to or different from one another, are selected from the group consisting of —H, —OH, and —(CH2)nCHCH2 with n as an integer number ranging from 1 to 10; provided that, among the substituents R5, R6, R7, R8 and R9, at least one is —OH and at least one is —(CH2)nCHCH2.

2. The rubber mixture according to claim 1, wherein, among the substituents R1, R2, R3, R4 and R10, only one is —OH and only one is —(CH2)nCHCH2; and
   among the substituents R5, R6, R7, R8 and R9, only one is —OH and only one is —(CH2)nCHCH2.

3. The rubber mixture according to claim 1, wherein said one or more antioxidant agents are compounds according to structural formula II or structural formula III:

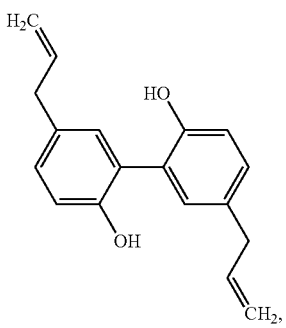

(II)

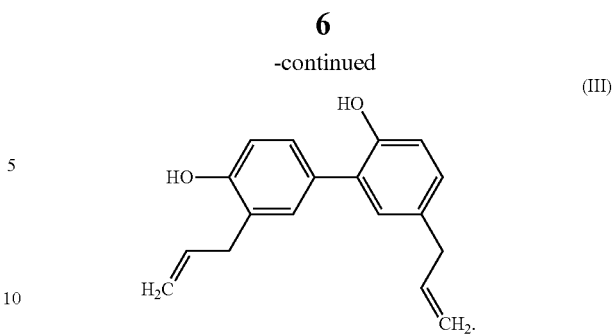

(III)

4. A tyre portion manufactured with the rubber mixture according to claim 1.

5. A tyre comprising at least one of the tyre portion according to claim 4.

6. A method for preparing a rubber mixture comprising a polymer base having a cross-linkable unsaturated chain, a vulcanization system, and one or more antioxidant agents, the method comprising:
   a first non-productive mixing step, during which said polymer base having a cross-linkable unsaturated chain and said one or more antioxidant agents are mixed together to form a first non-productive mixture;
   a second non-productive mixing step, during which other ingredients of the rubber mixture, except for said vulcanization system, are added to and mixed with said first non-productive mixture to form a second non-productive mixture; and
   a productive mixing step, during which said vulcanization system is added to and mixed with said second non-productive mixture;
   wherein said one or more antioxidant agents are compounds according to formula (I):

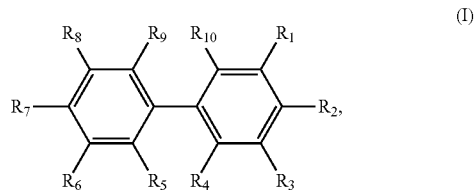

(I)

wherein, in formula (I), the substituents R1, R2, R3, R4 and R10, which are equal to or different from one another, are selected from the group consisting of —H, —OH, and —(CH2)nCHCH2 with n as an integer number ranging from 1 to 10; provided that, among the substituents R1, R2, R3, R4 and R10, at least one is —OH and at least one is —(CH2)nCHCH2; and
   the substituents R5, R6, R7, R8 and R9, which are equal to or different from one another, are selected from the group consisting of —H, —OH, and —(CH2)nCHCH2 with n as an integer number ranging from 1 to 10; provided that, among the substituents R5, R6, R7, R8 and R9, at least one is —OH and at least one is —(CH2)nCHCH2.

7. The method for preparing a rubber mixture according to claim 6, wherein, among the substituents R1, R2, R3, R4 and R10, only one is —OH and only one is —(CH2)nCHCH2; and
   among the substituents R5, R6, R7, R8 and R9, only one is —OH and only one is —(CH2)nCHCH2.

8. The method for preparing a rubber mixture according to claim 6, wherein said one or more antioxidant are the compounds according to structural formula (II) or structural formula (III):
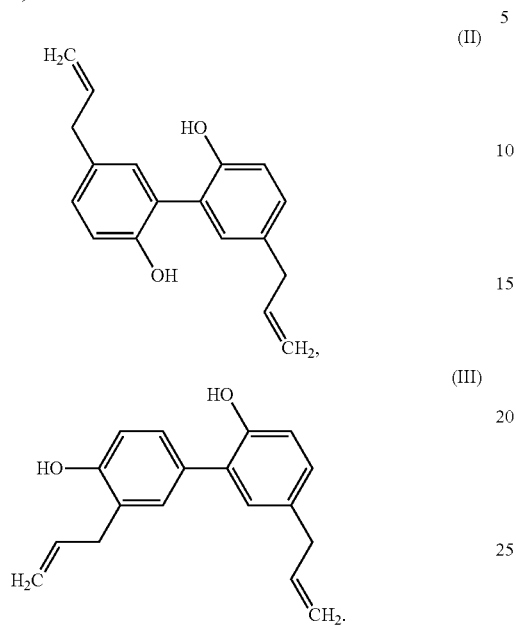
* * * * *